United States Patent Office 3,075,977
Patented Jan. 29, 1963

3,075,977
ETHERS OF 3-OXA- AND 3-THIA-9-AZABICYCLO-[3.3.1]-NONAN-7-OL
Charles L. Zirkle, Berwyn, Pa., assignor to Smith Kline & French Laboratories, Philadelphia, Pa., a corporation of Pennsylvania
No Drawing. Filed Apr. 7, 1960, Ser. No. 20,557
5 Claims. (Cl. 260—243)

This invention relates to pharmacologically active ethers of 3-oxa- and 3-thia-9-azabicyclo[3.3.1]-nonan-7-ol. The novel ethers of this invention are particularly effective as therapeutic agents for the treatment of disorders of the central and autonomic nervous systems. More specifically, these compounds are useful as antispasmodics, anticholinergics and anti-parkinsonism agents.

The novel ethers of 3-oxa- and 3-thia-9-azabicyclo-[3.3.1]-nonan-7-ol which are the subject of this invention are represented by the following fundamental formula:

Formula I

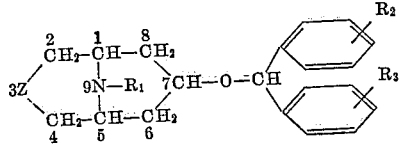

when:
Z represents oxygen or sulfur;
$R_1$ represents a straight or branched chain lower alkyl group, preferably containing from 1 to 4 carbon atoms, or phenylalkyl, the alkyl moiety preferably containing 1 or 2 carbon atoms; and
$R_2$ and $R_3$ represent hydrogen, methyl, methoxy or halogen of atomic weight less than 80.

Advantageous compounds of this invention are represented by Formula I above when:
Z represents oxygen or sulfur, preferably oxygen;
$R_1$ represents methyl, benzyl or phenethyl; and
$R_2$ and $R_3$ represent hydrogen, methyl, methoxy or chlorine, preferably in the ortho or para positions.

This invention also includes nontoxic salts of the above defined bases. Exemplary are salts formed with nontoxic organic and inorganic acids. Such salts are easily prepared by methods known to the art. The base is reacted with either the calculated amount of organic or inorganic acid in aqueous miscible solvent, such as acetone, or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example, 8-bromotheophylline. Exemplary of such inorganic salts are those with hydrochloric, hydrobromic, sulfuric, sulfamic, phosphoric and nitric acids. Of course, these salts may also be prepared by the classical method of double decomposition of appropriate salts which is well-known to the art.

Further exemplary of salts are nontoxic quaternary ammonium salts of the above defined bases formed with pharmacologically acceptable organic esters of, for example, sulfuric, hydrohalic and aromatic sulfonic acids. These salts are prepared by treating a solution of the base in a suitable solvent such as chloroform, acetone, benzene, toluene or ether with an excess of an organic ester of sulfuric, hydrohalic or aromatic sulfonic acid. This reaction is carried out most advantageously at a temperature in the range of from about 25° C. to about 115° C. Exemplary of such esters are methyl chloride, methyl bromide, methyl iodide, ethyl chloride, propyl bromide, butyl chloride, isobutyl chloride, ethylene bromohydrin, ethylene chlorohydrin, allyl bromide, methallyl bromide, crotyl bromide, benzyl chloride, benzyl bromide, naphthylmethyl chloride, phenethyl bromide, dimethyl sulfate, diethyl sulfate, methyl benzene sulfonate and ethyl toluene sulfonate.

The compounds of this invention are prepared by the following sequence of reactions:

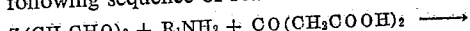

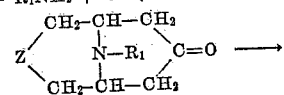

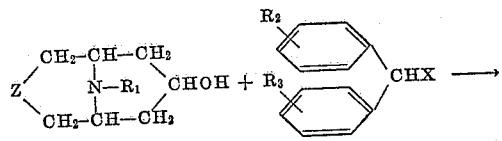

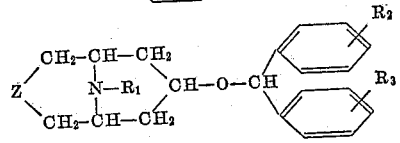

when Z, $R_1$, $R_2$ and $R_3$ are as defined above and X is halogen such as chlorine or bromine.

The dialdehyde is condensed with a primary amine, preferably in the form of an acid addition salt, such as the hydrochloride, and acetonedicarboxylic acid to form the corresponding 3-oxa- and 3-thia-9-azabicyclo[3.3.1]-nonan-7-ones. The reaction is carried out preferably at room temperature in an aqueous medium at about pH 5. The thus formed carbonyl compounds are reduced by chemical or catalytic means, preferably hydrogenating employing Raney nickel in ethanol when Z is oxygen or with lithium aluminum hydride in ether when Z is oxygen or sulfur.

The 3-oxa- and 3-thia-9-azabicyclo[3.3.1]-nonan-7-ols are then etherified with a suitable reactive halide, preferably chloride or bromide, to give the compounds of Formula I. Advantageously the alcohol and halide are reacted in a suitable inert organic solvent such as benzene, toluene or xylene, or a lower-carbon amide such as dimethylformamide, in which at least one of the reactants is soluble. The reaction mixture is preferably heated at the reflux temperature of the solvent employed, in the range of from about 70 to 160° C., for from 5 to 10 hours. The product is isolated by concentrating the reaction mixture, diluting with a non-polar solvent such as ether and cooling.

The foregoing method results in the formation of the hydrohalide salt of the desired ether. The corresponding free base is obtained from the salt by standard treatment with alkali.

Usually the above reaction is carried out in the presence of a base such as a tertiary amine for example tributylamine or pyridine, an alkali metal carbonate for example sodium or potassium carbonate or bicarbonate, or an alkali metal amide for example sodium or lithium amide.

The foregoing is a general description of the compounds of this invention and their preparation. It will be obvious that modifications of the basic structures and methods are possible. Modifications of the benzhydryl moiety in which either one or both of the benzene rings is mono or disubstituted by lower alkyl, lower alkoxy or replacement of the benzhydryl group by phenyl cyclohexylmethyl or dicyclohexylmethyl are all within the purview of the basic concept of this invention.

It will be readily apparent to one skilled in the art that certain of the compounds of this invention may be present as stereoisomers by virtue of the geometrical isomerism possible at $C_7$ in Formula I. The connotation of the general formulae presented herein is to include all isomers, including those having an α- or β-orientation at $C_7$ as well as the dl mixture of optical isomers may be separated for individual use by separation methods known to the art, such as fractional crystallization, for instance, of the d-tartrate salts of the ether derivatives.

The following examples are not limiting but illustrative of the compounds of this invention and their preparation.

Example 1

Ten grams of oxybisacetal (B.P. 83 to 85° C. at 0.2 mm., prepared by reacting 25.0 g. of benzyloxyacetal with 4.65 g. of sodium under nitrogen in liquid ammonia and ether, and coupling the resulting debenzylated product with 20.8 g. of bromoacetal and 1.65 g. of sodium iodide in toluene) is hydrolyzed in 75 ml. of hot water containing a few drops of concentrated hydrochloric acid. The solution is cooled and filtered. The aqueous solution of oxydiacetaldehyde is stirred while 3.24 g. of methylamine hydrochloride and 8.75 g. of acetonedicarboxylic acid is added. The mixture is adjusted to pH 3.0 by the addition of potassium carbonate. Over a period of 15 hours, the pH is readjusted to 5.4–5.65 and 4 ml. of concentrated hydrochloric acid is added. The clear solution is stirred for one hour, made basic with potassium carbonate to separate a solid and is extracted several times with chloroform. The combined organic extract is evaporated and the residue distilled to give an oil, B.P. 120–121° C. at 3.7 mm., which can be crystallized from ethyl ether to give a white crystalline solid, 9-methyl-3-oxa-9-azabicyclo[3.3.1]-nonan-7-one, M.P. 76–78° C.

By reacting a portion of the oil with picric acid in ethanol solution, the picrate salt is obtained as fine needles, M.P. 284° C.

A suspension of 31.0 g. of 9-methyl-3-oxa-9-azabicyclo[3.3.1]-nonan-7-one and 5.0 g. of Raney nickel in 250 ml. of ethanol is hydrogenated at 30 at 63° C. and 900 p.s.i. The catalyst is removed by filtration and the filtrate is evaporated in vacuo. The solid residue thus obtained is recrystallized from petroleum ether to give 9-methyl-3-oxa-9-azabicyclo[3.3.1]-nonan-7-ol.

A mixture of 2.0 g. of 9-methyl-3-oxa-9-azabicyclo-[3.3.1]-nonan-7-ol, 2.34 g. of tributylamine, 5.15 g. of benzhydryl chloride and 15 ml. of dimethylformamide is heated at reflux for eight hours, then concentrated. The solution is diluted with ether and cooled to give the hydrochloride salt of 7-benzhydryloxy-9-methyl-3-oxa-9-azabicyclo[3.3.1]-nonane, M.P. 232–234° C.

From the salt the free base is obtained which after recrystallization from petroleum ether melts at 87–89° C.

Example 2

A solution of 0.5 g. of 7-benzhydryloxy-9-methyl-3-oxa-9-azabicyclo[3.3.1]-nonane reacted with methyl bromide in acetone to give the methobromide in acetone to give the methobromide salt, M.P. 237–239° C. after recrystallization from aqueous ethanol.

Example 3

A suspension of 5.0 g. of 9-methyl-3-thia-9-azabicyclo-[3.3.1]-nonan-7-one, 1.22 g. of lithium aluminum hydride and 150 ml. of ether is reacted at reflux in a continuous extraction apparatus for six hours. The cooled reaction mixture is quenched with water. The ether extracts are dried and evaporated to an oily residue which crystallizes upon long standing to yield 9-methyl-3-thia-9-azabicyclo-[3.3.1]-nonan-7-ol.

A mixture of 10.0 g. of 9-methyl-3-azabicyclo[3.3.1]-nonan-7-ol, 23.8 g. of benzhydryl chloride, 9.5 g. of tributylamine and 80 ml. of dimethylformamide is heated at reflux for eight hours. Part of the solvent is allowed to evaporate. After diluting with ether, the mixture is cooled to give 7-benzhydryloxy-9-methyl-3-thia-9-azabicyclo[3.3.1]-nonane hydrochloride salt, M.P. 205–206° C. The free base melts at 164–172° C. after sublimation.

Example 4

A mixture of 11.0 g. of 9-methyl-3-oxa-9-azabicyclo-[3.3.1]-nonan-7-ol, 13.0 g. of tributylamine and 30.0 g. of o-methylbenzhydryl chloride in 150 ml. of dimethylformamide is refluxed for eight hours. The reaction mixture is concentrated, diluted with ether and cooled to give 7-(o-methylbenzhydryloxy)-9-methyl-3-oxa-9-azabicyclo[3.3.1]-nonane hydrochloride.

Example 5

A mixture of 7.9 g. of 9-methyl-3-oxa-9-azabicyclo-[3.3.1]-nonan-7-ol, 9.0 g. of tributylamine and 23.6 g. of p-chlorobenzhydryl chloride in 125 ml. of dimethylformamide is heated at reflux for eight hours. Most of the solvent is removed and the residue treated with ether and cooled to give 7-(p-chlorobenzhydryloxy)-9-methyl-3-oxa-9-azabicyclo[3.3.1]-nonane hydrochloride.

A solution of 1.0 g. of the corresponding free base in acetone is reacted with maleic acid to yield the maleate salt.

Example 6

To a solution of 5.9 g. of thiodiacetaldehyde in 50 ml. of water, 6.8 g. of butylamine hydrochloride and 11.0 g. of acetonedicarboxylic acid are added with stirring. The mixture is then treated and worked up as described in Example 1 to give 9-butyl-3-thia-9-azabicyclo[3.3.1]-nonan-7-one.

A suspension of 12.8 g. of 9-butyl-3-thia-9-azabicyclo-[3.3.1]-nonan-7-one, 2.3 g. of lithium aluminum hydride and 350 ml. of ether is reacted at reflux in a continuous extraction apparatus for eight hours. Working up as outlined in Example 1 yields 9-butyl-3-thia-9-azabicyclo-[3.3.1]-nonan-7-ol.

A mixture of 4.3 g. of 9-butyl-3-thia-9-azabicyclo-[3.3.1]-nonan-7-ol, 3.7 g. of tributylamine and 9.3 g. of p-methoxybenzhydryl bromide in 100 ml. of dimethylformamide is refluxed for eight hours. The reaction mixture is concentrated and diluted with ether to give 9-butyl-7-(p-methoxybenzyhydryloxy)-3-thia-9-azabicyclo-[3.3.1]-nonane hydrobromide.

Example 7

An aqueous solution of 10.2 g. of oxydiacetaldehyde, 19.7 g. of phenethylamine hydrochloride and 21.9 g. of acetonedicarboxylic acid is reacted as described in Example 1 to yield 3-oxa-9-phenethyl-9-azabicyclo[3.3.1]-nonan-7-one.

A suspension of 4.9 g. of 3-oxa-9-phenethyl-9-azabicyclo[3.3.1]-nonan-7-one and 0.5 g. of Raney nickel in 50 ml. of ethanol is hydrogenated as specified in Example 1 to yield 3-oxa-9-phenethyl-9-azabicyclo[3.3.1]-nonan-7-ol.

A mixture of the thus formed alcohol (2.5 g.), 1.9 g. of tributylamine, 3.6 g. of o-bromobenzhydryl chloride and 100 ml. of dimethylformamide is refluxed for eight hours and worked up as in Example 1 to yield 7-(o-bromobenzhydryloxy)-3-oxa-9-phenethyl-9-azabicyclo[3.3.1]-nonane hydrochloride.

Similarly, by employing benzylamine hydrochloride in the above reaction sequence, the corresponding 7-(o-bromobenzhydryloxy)-3-oxa-9-benzyl-9-azabicyclo[3.3.1]-nonane hydrochloride is obtained.

Example 8

A mixture of 5.2 g. of 9-methyl-3-thia-9-azabicyclo [3.3.1]-nonan-7-ol, 5.5 g. of tributylamine and 16.3 g. of p,p'-dichlorobenzhydryl chloride in 150 ml. of dimethylformamide is heated at reflux for eight hours. The reaction mixture is concentrated, diluted with ether and cooled to yield 7-(p,p'-dichlorobenzhydryloxy)-9-methyl-3-thia-9-azabicyclo[3.3.1]-nonane hydrochloride.

Similarly, 7-(o,p-dichlorobenzhydryloxy)-9-methyl-3-thia-9-azabicyclo[3.3.1]-nonane hydrochloride is prepared from 5.2 g. of 9-methyl-3-thia-9-azabicyclo[3.3.1]-nonan-7-ol and 16.3 g. of o,p-dichlorobenzhydryl chloride.

What is claimed is:

1. Chemical compounds of the class consisting of a free base, its nontoxic acid addition salts and its nontoxic quaternary ammonium salts formed with a pharmacologically acceptable organic ester of an acid selected from the group consisting of sulfuric, hydrohalic and aromatic sulfonic acid, the free base having the following formula:

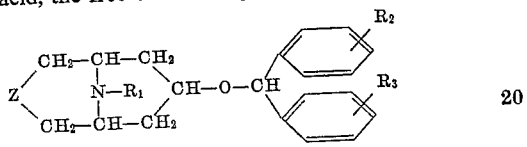

in which Z is a member selected from the group consisting of oxygen and sulfur; $R_1$ is a member selected from the group consisting of lower alkyl having from one to four carbon atoms and phenylalkyl having one to two carbon atoms in the alkyl moiety; and $R_2$ and $R_3$ are members selected from the group consisting of hydrogen, methyl, methoxy and halogen of atomic weight less than 80.

2. A chemical compound having the following formula:

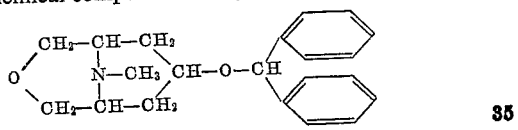

3. A chemical compound having the following formula:

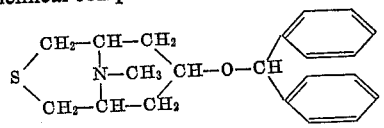

4. A chemical compound having the following formula:

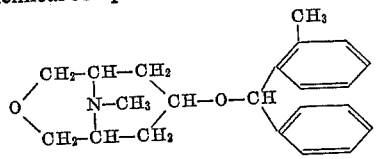

5. A chemical compound having the following formula:

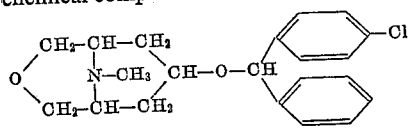

References Cited in the file of this patent

UNITED STATES PATENTS 2,706,198 Weijlard _____ Apr. 12, 1955
2,782,200 Nield et al. _____ Feb. 19, 1957
2,970,144 Zirkle _____ Jan. 31, 1961

OTHER REFERENCES

Dietrich et al.: Liebigs Annalen der Chemie, volume 608, pages 126–31 (1957).